(12) United States Patent
Coffing

(10) Patent No.: US 8,977,243 B2
(45) Date of Patent: *Mar. 10, 2015

(54) ELECTRONIC BUSINESS/PERSONAL CARD AND METHOD OF USE THEREOF

(76) Inventor: Dan Coffing, Fairfax, VA (US)

( * ) Notice: Subject to any disclaimer, the term of this patent is extended or adjusted under 35 U.S.C. 154(b) by 189 days.

This patent is subject to a terminal disclaimer.

(21) Appl. No.: 13/067,215

(22) Filed: May 17, 2011

(65) Prior Publication Data

US 2011/0294425 A1 Dec. 1, 2011

Related U.S. Application Data

(63) Continuation of application No. 11/489,435, filed on Jul. 20, 2006, now Pat. No. 7,962,157.

(51) Int. Cl.
*H04M 3/42* (2006.01)
*G06Q 10/10* (2012.01)

(52) U.S. Cl.
CPC ..................................... *G06Q 10/10* (2013.01)
USPC ..................... 455/414.1; 455/412.2; 455/418; 455/41.2

(58) Field of Classification Search
USPC .......................................................... 455/414
See application file for complete search history.

(56) References Cited

U.S. PATENT DOCUMENTS

| | | | |
|---|---|---|---|
| 5,086,394 A | 2/1992 | Shapira | |
| 6,408,351 B1 | 6/2002 | Hamdi et al. | |
| 7,420,472 B2 | 9/2008 | Tran | |
| 7,592,910 B2 | 9/2009 | Tuck et al. | |
| 2002/0161844 A1 | 10/2002 | Overtoom | |
| 2004/0120298 A1 | 6/2004 | Evans et al. | |
| 2004/0248569 A1 | 12/2004 | Kondou et al. | |
| 2005/0054352 A1* | 3/2005 | Karaizman | 455/456.3 |
| 2005/0170699 A1 | 8/2005 | Overtoom | |
| 2005/0174975 A1 | 8/2005 | Mgrdechian et al. | |
| 2005/0239450 A1 | 10/2005 | Wesby | |
| 2006/0035621 A1 | 2/2006 | Ghercioiu | |
| 2006/0041615 A1* | 2/2006 | Blank et al. | 709/204 |
| 2006/0109811 A1 | 5/2006 | Schotten et al. | |
| 2006/0138225 A1 | 6/2006 | Richley et al. | |
| 2007/0016443 A1 | 1/2007 | Wachman et al. | |
| 2007/0197261 A1 | 8/2007 | Humbel | |
| 2007/0260822 A1 | 11/2007 | Adams | |
| 2011/0117864 A1* | 5/2011 | Lazaridis | 455/90.1 |

OTHER PUBLICATIONS

PCT Notification of Transmittal of the International Search Report and the Written Opinion of the International Searching Authority, or the Declaration in International Application No. PCT/US 07/16307, dated Jan. 7, 2008.

* cited by examiner

*Primary Examiner* — Marcos Batista
(74) *Attorney, Agent, or Firm* — Nicholas Trenkle; Stites & Harbison, PLLC.

(57) ABSTRACT

The present invention includes a wireless communication method and device comprising a one-to-one exchange of wireless electronic device identifications or unique profile IDs between a sending and a receiving party who are both registered users of the electronic business/personal card service and further comprising upload of the wireless electronic identifications to a data server computer system wherein said system matches said identifications with those of registered users and said computer system displays information about the user associated with each identification.

20 Claims, 3 Drawing Sheets

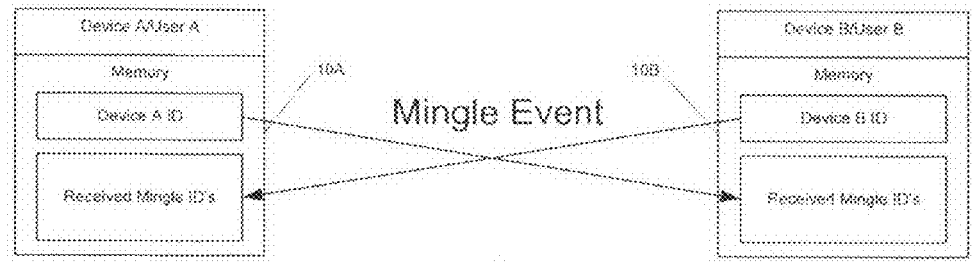
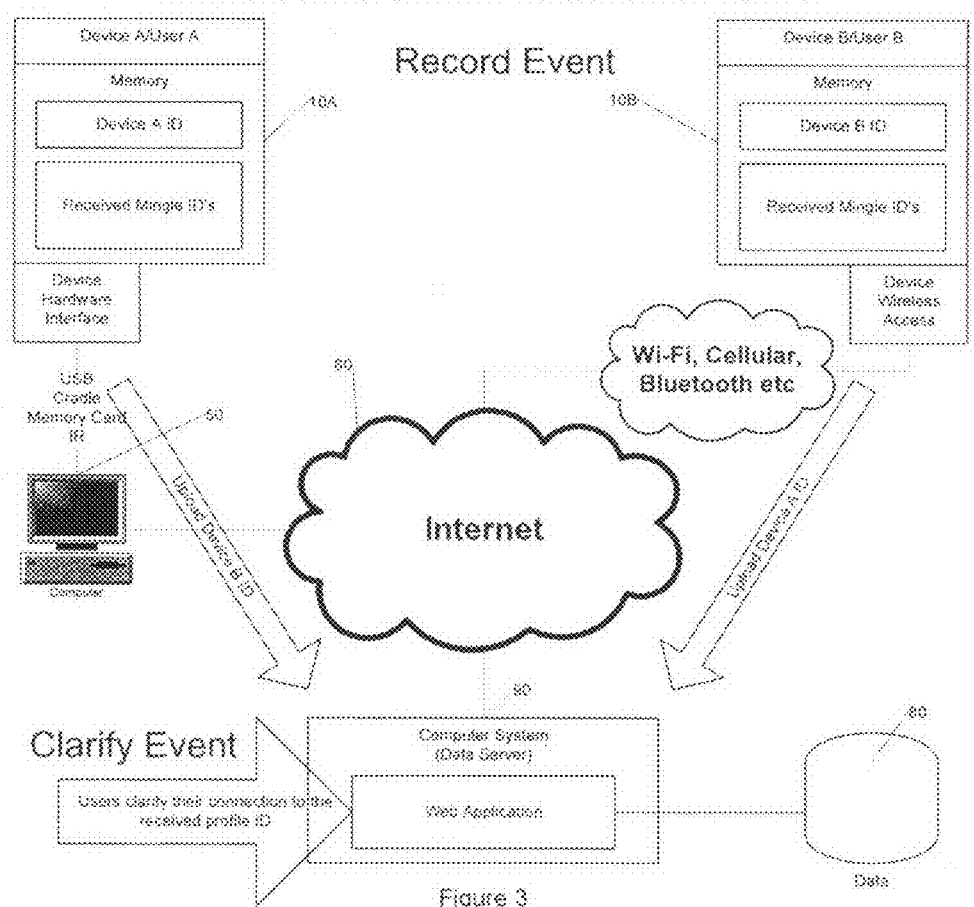

ELECTRONIC BUSINESS/PERSONAL CARD AND METHOD OF USE THEREOF

CROSS REFERENCE FOR RELATED APPLICATIONS

This application is a Continuation of U.S. application Ser. No. 11/489,435 filed on Jul. 20, 2006 now U.S. Pat. No. 7,962,157. Priority is claimed based on U.S. application Ser. No. 11/489,435 filed on Jul. 20, 2006, the content of which is hereby incorporated by reference into this application.

FIELD OF THE INVENTION

The present invention relates to directionally targeted narrow-beam wireless communication devices, and in particular, to systems and methods of using such devices to provide an exchange of information between wireless devices held by persons in the ordinary course of social or business engagement.

BACKGROUND OF THE INVENTION

The traditional way of exchanging information between parties who are in the same physical location is by the physical exchange of business or contact cards. An individual who is actively engaged in any sort of social or business networking will end up being encumbered by numerous business cards carrying no more than names, addresses and phone numbers and no other way of actively assessing the business or social compatibility of the card provider and there is no active tie to the party's online profile.

Where parties are not in the same physical location, on-line dating and social networking constitute internet-facilitated modalities for meeting persons particularly in social engagements.

In on-line dating, members complete anonymous user profiles that are kept in a central database. Users can then search the central database to further their social interests. Upon identifying compatible social interests, messages are exchanged via the intermediation of the service provider.

In social-networking services, users fill out profile information that is stored in a central database. Those profiles are associated with other users in an internodal network arrangement where each user is linked to one or more third-parties through another user with which they have a pre-existing personal or business relationship. Users employ various search criteria to identify a subset of other users whom they may be interested in meeting and are generally allowed to contact or view the profiles of only those users with whom they are connected to through this internodal networking environment.

The key limitation of both on-line dating and social networking services is that both are online dominated and do not tie in to a user's day to day interaction with the offline universe. In other words, cyber world contact precedes real world contact and there is always the danger that the cyber profile is overly embellished and at marked variance with the real world profile.

US Published Application 2005/0174975 deals with a wireless communication methodology wherein real world contact coincides with cyber world contact whereby a user could access information about a specific unknown person in their general location in order to decide whether potential compatibilities (either business or personal) may exist between them. In US 2005/0174975, a methodology is described whereby a user broadcasts a search for compatible social or business interests in their general physical vicinity, receives and electronically reviews information about a potential contact within his/her vicinity and initiates contact by sending the user's profile back to the potential contact, whereupon it is hoped that real world contact will then ensue. The drawback to this system is that the user spends their time broadcasting and sifting through a myriad of online social protocols, using intelligent devices having image and data display capabilities rather than spending valuable time making the far more profitable flesh to flesh contact.

There is therefore a need for a wireless interne-facilitated networking device and methods of use thereof wherein the real world contact precedes cyber world contact in both social and business intercourse. For socially or professionally active individuals who meet other social or business interests all the time, exchange of cards is often the most convenient way to perpetuate that contact. Even then, business cards as it were, carry very little information, often have no pictures, and remain bland and faceless long after the contact has faded from memory. In social situations in particular, cards are not often available resulting in the inconvenience of locating pen and paper or such. Further, there is often the need to revisit and reassess the social or business compatibility of a contact in a more dynamical setting.

SUMMARY OF THE INVENTION

Embodiments of the present invention include a directionally targeted narrow-beam, portable, wireless communication device and methods for its use to facilitate the recordation and recollection of business or social contacts. In one embodiment, the present invention includes a wireless face-to-face communication method comprising a one-to-one exchange of wireless electronic device identifications or unique profile IDs between a sending and a receiving party who are both registered users of the electronic business/personal card service. As used herein, device refers to the wireless electronic business/personal card of the present invention.

Once the device has received one or more profile IDs, typically at the end of the networking event, the user uploads these IDs to a data server computer system using any suitable means of data communication such as cradles or Bluetooth. In a preferred embodiment, uploading is done via a USB interface on the wireless device to an Internet-connected computer. In another embodiment, uploading may be done via a wireless communication to the interne.

In one embodiment, the unique ID stored in a receiver's wireless electronic card may be uploaded to a central service which may include a website, a database and one or many servers. The system will then match the IDs with those of registered users and display information, including images of the users associated with the IDs. The displayed information may also be available for download.

In another embodiment, the user who has uploaded the received IDs to the data server logs into a world wide web-interface that allows them to classify their received IDs according to type, group, interest or some other classification. Since the received ID belongs to another registered user of the system, a picture and other general information will be available to refresh the user's memory of the networking encounter and to determine what the levels of interaction should be. In one embodiment, both users will have ability to determine the level of their information that will be seen by the other, and to set the available channels for future communication, e.g. IM, email, phone, etc or none at all.

Alternate embodiments include the cases where: 1) user's device communicates with the server via a cable, cradle or other physical connection to a PC or other electronic apparatus which can relay ID or other information to the server; or 2) through any form of wireless connection such as Bluetooth Wi-Fi or 802.11 which could relay the ID or other information either directly or through some intermediary (such as a cellular network or PC) to the server.

It is also an object of the invention to allow users in a business networking contact to select the relationship type such that other service-subscriber contacts can electronically access their business contact information, and at the option of the subscriber, detailed business resume and pictures.

In one embodiment of the invention, an events organizer can use a stationary version of this device to gather and store profile IDs of attendees of the event, upload the profile IDs and have a list of prospects to communicate relevant news and offerings or other information relevant to the event. In a social networking embodiment, a list of locations frequented could be dynamically visible to one's trusted circle of online friends. Related online profile information may be such things as name, age, phone numbers, email address, zip codes of residence, activity, interests, blogs, photo's etc, depending on the nature and the type of the online connection site being utilized.

In another embodiment, the sender and receiver's wireless devices exchange ID's using a first local wireless protocol, and the uploading wireless device and a remote web-connected computer are coupled together over a second wireless network.

In yet another embodiment, the present invention includes a computer system coupled to a network, the computer system including software for performing a method comprising storing a plurality of wireless device identifications, storing information for a plurality of users, associating the wireless device identifications with the information, receiving wireless device identification from a wireless device via a computer interface and accessing the information associated with the one or more wireless device identifications. In one embodiment, the wireless device identifications and information are stored in a database accessible over the Internet.

In another embodiment, accessing the information comprises generating a query to a database using the wireless device identification and retrieving information associated with the wireless device identification in response to the query.

In yet another embodiment, the present invention includes a wireless electronic card device comprising an external case housing a power supply, a USB interface, a targetable, narrow-beam send/receive hardware component, a transmit button, confirmation LED(s), processor, memory, USB transaction software, selector switch, and internal clock/calendar. In other embodiments, the device is embedded in a watch, a broach, a pendant, a necklace, a ring, an earring, an article of clothing, a clothing label, a wallet or a key-chain. In other embodiments, the device is integrated into a credit-card form-factor.

The wireless electronic business/personal card devices of the present invention can be of multiple forms including ones with only the discrete functionality of the present invention, or integrated into or with other devices such as cell-phones, PDA's or music players either through embedded hardware or as a software application. In addition, the devices can have the capability to act as both Sender and Recipient (for users interested in sending and receiving profile IDs), to act only as a Sender (for users not interested in receiving profile IDs) or to act only as a Recipient (for users who are interested in receiving profile IDs). Additionally, particularly in the case of a Recipient-only device, one embodiment of the present invention provides that the form-factor can be such that the device appears as a piece of jewelry such as a broach, pendant, ring, earring, or as a clothing label, a key-chain, integrated into a credit-card form-factor, integrated into clothing itself or as some other fashion statement which can be both aesthetically pleasing and alert others that a person is a user of the system.

Additional embodiments of the present invention also include medical applications where a user's online profile may contain medical or other information that may be accessed by a doctor, pharmacist, emergency services technician or other health care provider. Yet another embodiment of the present invention includes software, which can be downloaded into an existing platform to enable it to practice the present invention and perform in the techniques described herein.

Embodiments of the present invention also include any and all business methods for generating revenue and income through the sales of hardware, software and services that include one or more embodiments of the invention described herein. These include (a) selling software for use on an existing hardware platform to enable the invention, (b) the sale of hardware (including jewelry or other form factors) to enable the invention, and (c) charging users on an annual, monthly or per-message basis for use of the service/invention. These business methods also include the ability to charge users for the exchange of messages or information processed through one or many central servers based on IDs exchanged earlier between mobile devices as described above. Users of the device and service (i.e. senders or recipients, or both), may include individuals, businesses, not-for-profit organizations, advertisers, political action groups, or any other organization.

The preferred embodiment of the present invention would also include (e.g., as part of the server) a web-based user interface for registration and profile management. Information provided by users through this interface would include, but not be limited to the unique ID of their mobile device, their name, address, billing information (if applicable), username, profile information, photo, preferences and names of friends. The user interface could also function as a messaging center in which the user can keep track of messages sent or received as well as the profiles that they have viewed. Embodiments of the present invention include hardware or software allowing a mobile device, such as a cell phone, to incorporate some or all of this functionality.

Additional embodiments will be evident from the following detailed description and accompanying drawings, which provide a better understanding of the nature and advantages of the present invention.

BRIEF DESCRIPTION OF THE DRAWINGS

FIG. 2 is another illustration of a contact event according to another embodiment of the present invention.

FIG. 3 is an example of a system according to another embodiment of the present invention.

DETAILED DESCRIPTION OF PREFERRED EMBODIMENTS

In the following description, for purposes of explanation, specific details are set forth in order to provide a thorough understanding of different aspects of the present invention. It will be evident, however, to one skilled in the art that the present invention as defined by the claims may include some or all of the features or embodiments herein described and may further include obvious modifications and equivalents of the features and concepts described herein.

Embodiments of the present invention use wireless protocols and networks for implementing novel methods and algorithms that obviate the need for non-electronic business and contact cards. Wireless signaling protocols may be used to exchange unique electronic profile IDs between user-subscribers who wish to perpetuate the contact. As used in this specification, profile IDs refer to unique electronic identifications associated with a given user and a given device.

The present invention provides users with the ability to first interact in the real world and follow up, if desired, by further interaction in the cyber world, thus obviating the need to browse through boring, contrived or misleading classified advertisements or on-line profiles.

Figure 1:
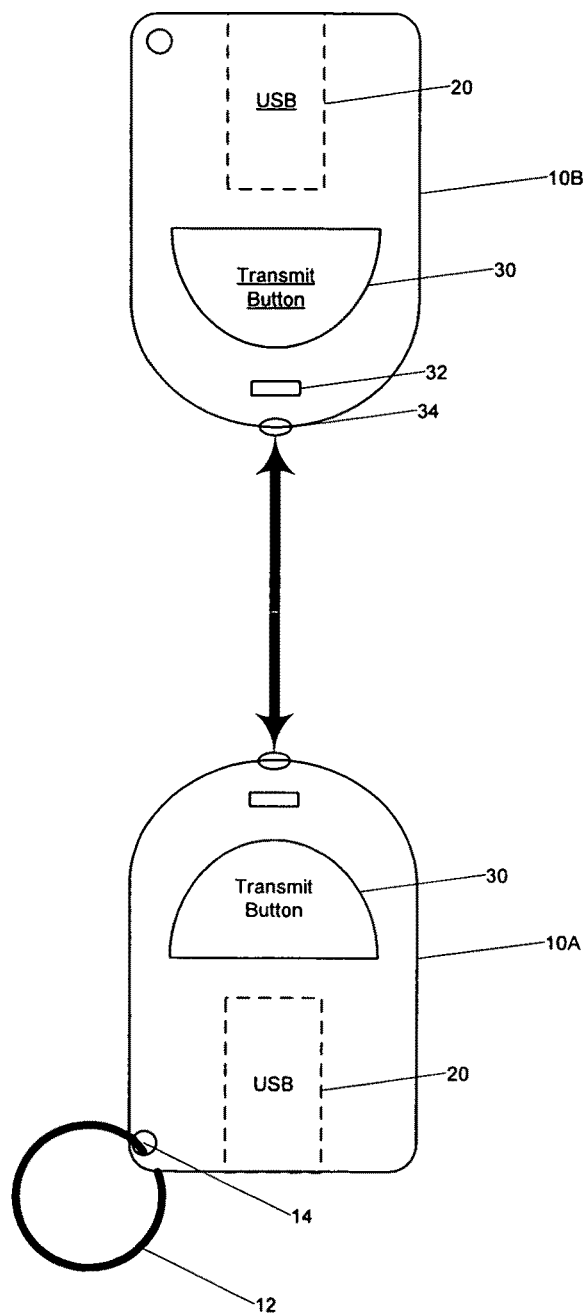
FIG. 1 illustrates a contact event between two devices according to one embodiment of the present invention.

FIG. 1 illustrates a contact event according to one embodiment of the invention. Wireless devices I OA and I OB each comprise a power supply, a USB 20, a single transmit button 30 for transmitting profile IDs, a LED 32, and an Infra red transmitter/receiver. FIG. 1 illustrates a directional mode of data exchange between devices I OA and I OB which are preferably less than five feet apart and pointed at each other. In another embodiment, the uni-direction transmission range is extended to 30-40 ft such that a passive device could receive IDs from interested parties within sight, but not within conversational distance.

The preferred mode of communication between the devices is a directionally targeted narrow electromagnetic beam or ultrasonic beam sent between one sending and one receiving device. Since the intent is to support one to one personal contact, the design is such as to prevent the exchange of ID's other than to/from the intended physically proximate party. The same or different wireless technology may be used for a reply made by the receiving device to the sending device. However, embodiments of the presented invention are not limited to any specific currently existing or future wireless technologies.

As illustrated in FIG. 3, the receiving device IOA and IOB, having no display capability, may upload the received device IDs to a computer system 50 connected to the Internet 60. Computer system 50 may be an Internet server computer and may include multiple computers coupled to the Internet for processing information as described herein, for example, and may further include a web application 70 having a user interface that allows users to update their profile, store, classify, and organize their portfolio of profiles. Computer system 50 may provide access to further information about the user of the sending device or other users associated with the device IDs received from the sending device. Furthermore, computer system 50 may act as a central storage location for all user information as well as a clearinghouse and delivery system for messages sent between users.

For example, the device IDs may be uploaded to a computer system 50 and used by a web application 70 and a database 80 to access information associated with each device ID. In one embodiment, when computer system 50 receives a device ID, web application 70 may generate a database query using the device IDs received from wireless device 10. Database 80 retrieves information associated with each device ID in the query, and then formats the information to display to the user-subscriber. In one embodiment, device IDs may be included as fields (e.g., indexes) in database tables that are associated with other information in the database, for example. The association may be implemented using a variety of techniques such as associated fields in a relational database or as links or references between objects, for example. The information in database 80 may have been set up previously by a user accessing a web address for computer system 50 (e.g., using the web application 70) or a related website or using a related web application such as an Internet browser. Database 80 may be a single database, distributed database or other data storage systems that can use device IDs to access information associated with device IDs. The associated information may be updated automatically or manually by a user who accesses the information through computer system 50 (e.g., over the Internet or wirelessly). After the associated information has been retrieved, computer system 50 displays the information for the user-subscriber via a service provider interface.

Profile information may include a variety of information about a user's likes and dislikes, background, education, friends and other information such as text, audio, video, images (i.e., electronic pictures of the user), Blogs, links to favorite websites or items or services for sale. In one embodiment, users may specify a list of friends. Profile information for one or more parties met in the offline world may be stored internally on a user-subscriber computer system 50 or selectively deleted. Some or all of the profile information may be saved (e.g., as a complete profile or as a summary profile). Such profile information may be useful if the user desires to further pursue a mutual interest at a later time.

An additional embodiment of the present invention includes the use of the service and/or hardware for the electronic commerce applications including micropayments. Micropayments are prepaid accounts that may be used for low dollar amount purchases. Additional embodiments of the present invention also include medical applications where a user profile may contain medical or other information that may be accessed by a doctor, pharmacist, emergency services technician or other health provider. Yet another embodiment of the present invention includes software, which can be downloaded into an existing platform to enable it to practice the present invention and perform in the techniques described herein.

Embodiments of the present invention may also include business methods for generating revenue and income through the sales of hardware, software and services using the techniques described herein. These include (a) selling software for use on existing hardware platforms to enable the invention, (b) the sale of hardware (including jewelry or other form factors described below) to enable the invention, and (c) charging users on an annual, monthly or per-message basis for use of the services described herein. These business methods also include the ability to charge users for the exchange of messages or information processed through one or many central servers based on IDs exchanged between mobile devices and then uploaded as described above. It is to be understood that a variety of users (i.e. senders or recipients, or both) may benefit from various applications of the present invention. Users of the devices and services may include individuals, businesses, not-for-profit organizations, advertisers, political action groups, or any other organization.

Figure 4:
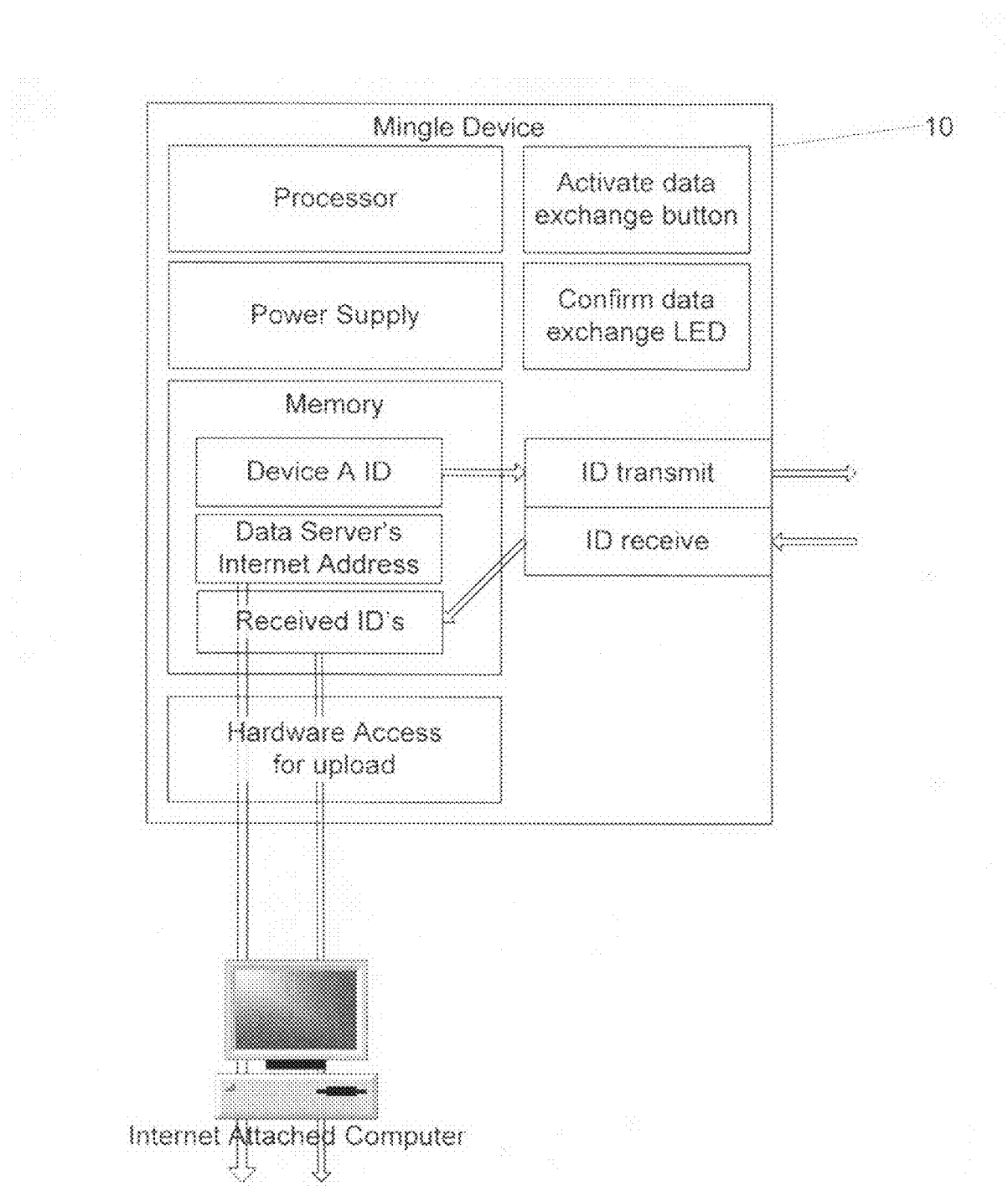
FIG. 4 is a functional schematic of a device according to another embodiment of the present invention.

FIG. 4 is an example of a wireless device according to an embodiment of the present invention. Wireless device 10 may act as both a sending and a receiving device. As the device is composed of components that are readily available, specification shall be by function, rather than address the technical particulars. In one embodiment, the device is a stand alone device having an external case. In the primary embodiment, the device shall be small, and in the form factor akin to the familiar wireless key ring devices used for remotely locking automobiles. Any plastic that is durable enough to handle frequent jostling will suffice. In other embodiments the electronic parts might be mounted in a 'dongle', a piece of jewelry, article of clothing or such. The key requirement is that it be portable and readily accessible in most social environments. In a preferred embodiment, the device weighs one ounce or less. In the stationary models for premise registrations, no restriction on form factor is required. Devices may be designed as suits the mounting structure, the scheme for accessing the Internet, as well as other aesthetics or functions may dictate.

In a preferred embodiment, the device is ruggedized by any means known in the art so that it can withstand the jostle and tumble of everyday life.

In another embodiment, the device shall have a retractable, foldable, or otherwise physically protected male USB interface such that the device can quickly interface to a computer. The USB interface shall be discrete and protected when not in use. Also, in one embodiment, the device shall have an infrared emitter for sending and receiving short bursts of data to/from a sister device. In a preferred embodiment, the transmitter will use data-transmission protocols suitable for successful delivery of 256 bits of data. The device shall have a single button to activate the IR send/receive function and the exchange of wireless identifications shall be accomplished by single button exchanges so that the flavor of the moment is not diluted by multiple clicks and button exchanges. When pressed, the emitter shall transmit the user's device ID until released, up to 15 seconds. If the button is held down longer than 15 seconds it will need to be released and re-pressed for the device to begin the cycle again. It is to be understood that longer or shorter transmission times are part of the invention. In the stationary embodiment, the device shall be set to always receive via an on/off switch.

While the device is transmitting data using the IR interface the LED(s) shall use a signal pattern (e.g. blinking) to indicate to the user the device's activity. When the IR receiver successfully receives data from another device the LED shall show an alternate signal pattern (e.g. solid for 2 seconds) to indicate the reception. Also, devices shall have an internal processor to control the interaction of the various electronic components. Including: the inter-device signaling protocol (IR or otherwise); error checking to prevent multiple copies of the same data being written successively; the LED signal pattern; the USB upload protocol; the initial process of the device to the data server and assigning it it's unique ID; the initiation process of the device to upload the particular users profile to the data server.

The read many-write once memory of the device shall contain the unique device ID and the Internet address of the data server. The read-write memory of the device shall receive the device ID's from the IR receive component and shall make them accessible via the USB interface.

Upon insertion into the USB of an Internet enabled computer, the device shall autorun a command that uploads the received ID's to the data server along with device ID so that the data can be associated with the correct online profile. The user is then taken to the login screen for the interface to the data server so that they're able to classify the recent uploaded contacts. If the automatic upload should fail, the user will also have the ability to query the device from the web interface so that the information can be retrieved.

In one embodiment, the device may be equipped with a manual switch with several settings such that the received ID's are pre-tagged with a certain group, social type or interest so as to shorten the processing during classification. Also, the devices may have an internal clock to date-time stamp the actual contact or mingling events The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Additionally, embodiments of the present invention may cover the operation of a wireless device, including software algorithms performed on a wireless device, or the operation of a computer system, including software algorithms performed on a server, database or other computer network configuration for implementing backend processing. Based on the above disclosure and the following claims, other arrangements, embodiments, implementations and equivalents will be evident to those skilled in the art.

What is claimed is:

1. An apparatus for facilitating managed exchanges of information between contacts following a face-to-face interaction between the contacts, the apparatus comprising:
   an application server providing a network service that is accessible through one or more client systems communicatively coupled to the application server via a network; and
   a data storage device storing a personal information database that is maintained by the application server, the personal information database including a plurality of user accounts respectively associated with a plurality of communication devices, each user account including a unique identification for the communication device respectively associated with the user account, a set of user information, and a plurality of relationship levels each associated with a respective subset of the set of user information of the user account that is available to be shared, and
   wherein any first communication device of the plurality of communication devices is configured to perform a one-to-one wireless exchange with any second communication device of the plurality of communication devices by wirelessly transmitting the unique identification for the first communication device to the second communication device and receiving the unique identification for the second communication device wirelessly transmitted by the second communication device in response to a mutually-timed activation of the first and second communication devices,
   wherein the application server operates to, in response to receiving a notification that the first communication device has received the unique identification for the second communication device and, in association with the notification, a specification of one of the relationship levels included within the user account respectively associated with the first communication device, access the personal information database to establish an association within the user account respectively associated with the first communication device between the unique identification for the second communication device and the specified relationship level, and
   wherein the network service, in response to receiving a request, from one of the client systems being operated in association with the user account respectively associated with the second communication device, for the set of user information of the user account respectively associated with the first communication device, operates to return the respective subset of the set of user information for the user account respectively associated with the first communication device associated with the indicated relationship level.

2. The apparatus of claim 1, wherein the application server implements a web application to provide the network service, and wherein each of the client systems implements a client application configured to provide a web-based user interface for accessing the network service provided by the application server via the web application.

3. The apparatus of claim 2, wherein the network service, upon being accessed by a user of one of the client systems in association with the user account associated with any of the plurality of communication devices, is operable to implement functionality via the web-based user interface for allowing the user to input information for editing and managing the set of user information, the plurality of relationship levels, and the respective subset of the set of user information that is available to be shared for each of the relationship levels included in the user account and to access the personal information database to update the user account based on the information input by the user via the web-based user interface.

4. The apparatus of claim 2, wherein the network service, upon being accessed by a user of one of the client systems in association with the user account associated with any of the plurality of communication devices, is operable to implement functionality via the web-based user interface to present, for each user account respectively associated with any other of the plurality of communication devices for which an association is established in the personal information database between the unique identification for the communication device and a specified one of the plurality of relationship levels of the user account respectively associated with the other communication device, a display of the respective subset of the set of user information for the user account respectively associated with the other communication device associated with the specified one of the relationship levels.

5. The apparatus of claim 2, wherein, upon the application server receiving the notification that the first communication device has received the unique identification for the second communication device, the network service, upon being accessed by a user of one of the client systems in association with the user account associated with the first communication device, is operable to receive the specification of one of the relationship levels included within the user account respectively associated with the first communication device from the user via the web-based user interface.

6. The apparatus of claim 5, wherein the application server, prior to receiving the specification of one of the relationship levels included within the user account respectively associated with the first communication device in association with the notification that the first communication device has received the unique identification for the second communication device, maintains an association within the user account respectively associated with the first communication device between the unique identification for the second communication device and a default relationship level within the personal information database, and wherein the default relationship level is associated with a limited subset of the set of user information included in the user account respectively associated with the first communication device.

7. The apparatus of claim 1, wherein the first communication device includes a memory component and is configured to store each unique identification received from any other of the plurality of communication devices within the memory component.

8. The apparatus of claim 7, wherein the first communication device includes an interface for communicatively coupling to at least a first client system of the one or more client systems, and wherein, upon the first communication device being coupled to the first client system via the interface, each unique identification stored within the memory component of the first communication device for any other of the plurality of communication devices is automatically transmitted from the first client system to the application server via the network.

9. The apparatus of claim 7, wherein the first communication device includes a wireless network interface, and wherein, upon the first communication device connecting to the application server over the network via the wireless network interface, each unique identification stored within the memory component of the first communication device for any other of the plurality of communication devices is automatically transmitted by the first communication device to the application server via the network.

10. The apparatus of claim 7, wherein the first communication device is configured to allow a selection of a relationship level to be made from one or more of the plurality of relationship levels of the user account to be associated with the unique identification for the second communication device upon receiving the unique identification for the second communication device in response to the mutually-timed activation of the first and second communication devices, wherein the first communication device is configured to, if a selection of a relationship level to be associated with the unique identification for the second communication device is made, store an indication of the selected relationship level in association with the unique identification received from the second communication device within the memory component of the first communication device, and wherein the application server is configured to, in conjunction with receiving the notification that the first communication device has received the unique identification for the second communication device, receive the indication of the selected relationship level as the specification of one of the relationship levels included within the user account respectively associated with the first communication device in association with the notification.

11. The apparatus of claim 7, wherein the first communication device includes an internal clock mechanism and is configured to generate and store a timestamp in association with the unique identification received from the second communication device within the memory component of the first communication device.

12. The apparatus of claim 1, wherein each of the plurality of communication devices includes an activation button, wherein each of the plurality of communication devices is configured to, in response to the activation button of the communication device being depressed, wirelessly transmit the unique identification for the communication device and, when the communication device is within a predetermined proximity of the any other of the plurality of communication devices, receive the unique identification of the other communication device wirelessly transmitted by the other communication device, and wherein the mutually-timed activation of the first and second communication devices comprises mutually depressing the activation buttons of the first and second communication devices while the first and second communication devices are within the predetermined proximity of each other.

13. The apparatus of claim 12, wherein each of the communication devices can be set to any one of a first mode in which the communication device wirelessly transmits the unique identification for the communication device but cannot receive any unique identification wirelessly transmitted by any of the other communication devices in response to the activation button of the communication device being depressed, a second mode in which the communication device can receive any unique identification wirelessly transmitted by any of the other communication devices within the predetermined proximity of the communication device but cannot wirelessly transmits the unique identification for the communication device in response to the activation button of the communication device being depressed, and a third mode in which the communication device wirelessly transmits the unique identification for the communication device and can receive any unique identification wirelessly transmitted by any of the other communication devices within the predetermined proximity of the communication device in response to the activation button of the communication device being depressed.

14. A method for facilitating managed exchanges of information between contacts following a face-to-face interaction between the contacts, the method comprising:
providing, at an application server, a network service that is accessible through one or more client systems communicatively coupled to the application server via a network;
maintaining, in a data storage device, a personal information database that includes a plurality of user accounts respectively associated with a plurality of communication devices, where each user account includes a unique identification for the communication device respectively associated with the user account, a set of user information, and a plurality of relationship levels each associated with a respective subset of the set of user information of the user account that is available to be shared;
receiving, at the application server, a notification that a first communication device of the plurality of communication devices received the unique identification for a second communication device of the plurality of communication devices in a one-to-one wireless exchange performed between the first and second communication devices in response to a mutually-timed activation of the first and second communication devices in which the second communication device wirelessly transmitted the unique identification for the second communication device to the first communication device;
receiving, at the application server and in association with the notification, a specification of one of the relationship levels included within the user account respectively associated with the first communication device;
in response to receiving the specification of one of the relationship levels included within the user account respectively associated with the first communication device, accessing the personal information database to establish an association within the user account respectively associated with the first communication device between the unique identification for the second communication device and the specified relationship level; and
in response to receiving a request, from one of the client systems being operated in association with the user account respectively associated with the second communication device, for the set of user information of the user account respectively associated with the first communication device, providing a reply to the client system that includes the respective subset of the set of user information for the user account respectively associated with the first communication device associated with the indicated relationship level.

15. The method of claim 14, wherein the application server implements a web application to provide the network service, and wherein each of the client systems implements a client application configured to provide a web-based user interface for accessing the network service provided by the application server via the web application.

16. The method of claim 15, further comprising, upon the network service being accessed by a user of one of the client systems in association with the user account associated with any of the plurality of communication devices, presenting, via the web-based user interface, for each user account respectively associated with any other of the plurality of communication devices for which an association is established in the personal information database between the unique identification for the communication device and a specified one of the plurality of relationship levels of the user account respectively associated with the other communication device, a display of the respective subset of the set of user information for the user account respectively associated with the other communication device associated with the specified one of the relationship levels.

17. The method of claim 15, further comprising, upon the application server receiving the notification that the first communication device has received the unique identification for the second communication device, and upon the network service being accessed by a user of one of the client systems in association with the user account associated with the first communication device, receiving the specification of one of the relationship levels included within the user account respectively associated with the first communication device from the user via the web-based user interface, and
wherein the application server, prior to receiving the specification of one of the relationship levels included within the user account respectively associated with the first communication device in association with the notification that the first communication device has received the unique identification for the second communication device, maintains an association within the user account respectively associated with the first communication device between the unique identification for the second communication device and a default relationship level within the personal information database, and wherein the default relationship level is associated with a limited subset of the set of user information included in the user account respectively associated with the first communication device.

18. A system for facilitating managed exchanges of information between contacts following a face-to-face interaction between the contacts, the system comprising:
a plurality of communication devices respectively having a plurality of unique identifications, each communication device being configured to perform a one-to-one wireless exchange with any other communication device of the plurality of communication devices by wirelessly transmitting the unique identification for the communication device to the other communication device and receiving the unique identification for the other communication device wirelessly transmitted by the other communication device in response to a mutually-timed activation of the communication devices and the other communication device;
an application server providing a network service;
a data storage device storing a personal information database that is maintained by the application server, the personal information database including a plurality of user accounts respectively associated with the plurality of communication devices, each user account including the unique identification for the communication device respectively associated with the user account, a set of user information, and a plurality of relationship levels each associated with a respective subset of the set of user information of the user account that is available to be shared; and one or more client systems configured to communicatively couple to the application server via a network to access the network service in association with any one of the plurality of user accounts, and wherein the application server operates to, in response to receiving a notification that a first communication device of the plurality of communication devices has received the unique identification for a second communication device of the plurality of communication devices and, in association with the notification, a specification of one of the relationship levels included within the user account respectively associated with the first communication device, access the personal information database to establish an association within the user account respectively associated with the first communication device between the unique identification for the second communication device and the specified relationship level, and wherein, in response to receiving a request, from one of the client systems accessing the network service in association with the user account respectively associated with the second communication device, for the set of user information of the user account respectively associated with the first communication device, the network service operates to return the respective subset of the set of user information for the user account respectively associated with the first communication device associated with the indicated relationship level.

19. The system of claim 18, wherein the first communication device includes a memory component and is configured to store each unique identification received from any other of the plurality of communication devices within the memory component, and wherein the first communication device includes an internal clock mechanism and is configured to generate and store a timestamp in association with the unique identification received from the second communication device within the memory component of the first communication device.

20. The system of claim 18, wherein each of the plurality of communication devices includes an activation button, wherein each of the plurality of communication devices is configured to, in response to the activation button of the communication device being depressed, wirelessly transmit the unique identification for the communication device and, when the communication device is within a predetermined proximity of the any other of the plurality of communication devices, receive the unique identification of the other communication device wirelessly transmitted by the other communication device, and wherein the mutually-timed activation of the first and second communication devices comprises mutually depressing the activation buttons of the first and second communication devices while the first and second communication devices are within the predetermined proximity of each other.

* * * * *